United States Patent Office

3,632,827
Patented Jan. 4, 1972

3,632,827
PREPARATION OF AROMATIC ISOCYANATES
Eric Smith, Madison, Conn., assignor to Olin Mathieson Chemical Corporation
No Drawing. Filed Nov. 21, 1968, Ser. No. 777,890
Int. Cl. C07c 119/04
U.S. Cl. 260—453 P        20 Claims

ABSTRACT OF THE DISCLOSURE

The process for preparing an organic isocyanate by reacting an organic nitro compound with carbon monoxide in the presence of a catalyst system comprised of (1) a nitrogen-containing heteroaromatic compound and (2) a halide of a noble metal, and (3) a halide of a non-noble metal selected from the group consisting of iron and the metals of Groups IVa, Va, VIa, VIIa, IIb, IVb and Vb of the Periodic Table. The heteroaromatic nitrogen-containing compound is one containing between five and six members in the ring, containing no element other than nitrogen and carbon in the ring, and having at least two double bonds in the ring. Pyridine and isoquinoline are the preferred heteroaromatic compounds. The noble metal halide is preferably a halide of palladium, rhodium, iridium, rhenium, platinum or mixtures thereof. The preferred non-noble metal halides are halides of titanium, zirconium, vanadium, tantalum, chromium, manganese, iron, zinc, mercury, germanium, tin, lead, arsenic, antimony and bismuth. A fourth component, such as molybdenum trioxide or another metal oxide, may also be included in the catalyst system.

---

This invention relates to catalyst systems useful in the preparation of organic isocyanates from organic nitro compounds.

Organic isocyanates are used extensively in the preparation of urethane foams, coatings, and fibers, as well as in the preparation of insecticides, pesticides, and the like. Commercial processes for preparing organic isocyanates utilize the catalytic hydrogenation of an organic nitro compound to form the corresponding amine, followed by reaction of the amine with phosgene to form the corresponding isocyanate. These processes are complex and expensive, and the need for a simplified, less expensive process is apparent.

In order to provide a simplified technique, it has been proposed to react an organic nitro compound with carbon monoxide in the presence of a catalyst. For example, British Pat. No. 1,025,436 discloses a process for preparing isocyanates from the corresponding nitro compounds by reacting an organic nitro compound with carbon monoxide in the presence of a noble metal-based catalyst. This process is not used commercially, because no more than trace amounts of organic isocyanates are formed when an organic nitro compound such as dinitrotoluene is reacted with carbon monoxide using a noble metal-based catalyst, such as rhodium trichloride, palladium dichloride, iridium trichloride, osmium trichloride and the like.

Other proposed simplified techniques utilize other catalyst systems. For example, Belgian Pat. No. 672,405 entitled "Process For The Preparation Of Organic Isocyanates," describes the use of a catalyst system of a noble metal and/or a Lewis acid in the reaction between an organic nitro compound with carbon monoxide.

Unfortunately, the yield of organic isocyanate afforded by these simplified techniques has not been significant enough to justify their use on a commercial scale.

It is a primary object of this invention to provide an improved process for the preparation of organic isocyanates.

Another object of the invention is to provide a novel catalyst system useful in the direct conversion of organic nitro compounds to the corresponding organic isocyanates.

Still a further object is to provide an improved process for preparing aromatic isocyanates such as phenyl isocyanate, toluene diisocyanates, and isocyanato-nitrotoluenes.

These and other objects of the invention will be apparent from the following detailed description thereof.

It has now been discovered that the above-mentioned objects are accomplished when an organic nitro compound is reacted with carbon monoxide at an elevated pressure and elevated temperature in the presence of:

(I) a catalyst system comprised of
  (A) at least one heteroaromatic compound selected from the group consisting of
    (1) a heteroaromatic compound containing
      (a) between 5 and 6 members in the ring,
      (d) at least two double bonds in the ring,
      (c) no more than two nitrogen atoms in the ring, and
      (a) at least two double bonds in the ring,
    (2) derivatives of IA(1),
  (B) at least one halide of a noble metal, and
  (C) at least one halide of a non-noble metal selected from the group consisting of iron and the metals of Groups IVa, Va, VIa, VIIa, IIb, IVb, and Vb of the Periodic Table or
(II) a catalyst system comprised of (1) a complex of a compound of IA and a halide of IB and (2) at least one halide of IC, or
(III) a catalyst system comprised of (1) a complex of a halide of IB and a halide of IC and (2) at least one compound of IA.

Certain metallic compounds promote the effectiveness of the catalyst system, including oxides of metals of Groups Va and VIa of the Periodic Table. The Periodic Table referred to herein is the Periodic Table shown on page 122 of Inorganic Chemistry by Moeller, John Wiley and Sons, Inc. 1952.

Any organic nitro compound capable of being converted to an organic isocyanate may be employed as a reactant. Generally, aromatic, cycloaliphatic, and aliphatic mono- or polynitro compounds, which may be substituted, if desired, can be reacted to form the corresponding mono- or poly-isocyanates by the novel process of this invention. The term "organic nitro compound," is used throughout the description and claims to define unsubstituted as well as substituted organic nitro compounds of the type described herein. Typical examples of suitable organic nitro compounds which can be reacted to form isocyanates include the following:

(I) Aromatic nitro compounds (a) Nitrobenzene
(b) Nitronaphthalenes
(c) Nitroanthracenes
(d) Nitrobiphenyls
(e) Bis(nitrophenyl)methanes
(f) Bis(nitrophenyl)ethers
(g) Bis(nitrophenyl)thioether
(h) Bis(nitrophenyl)sulfones
(i) Nitrodiphenoxy alkanes
(j) Nitrophenothiazines

(II) Nitrocycloalkanes (a) Nitrocyclobutane
(b) Nitrocyclopentane
(c) Nitrocyclohexane
(d) Dinitrocyclohexanes
(e) Bis(nitrocyclohexyl)methanes

(III) Nitroalkanes (a) Nitromethane
(b) Nitroethane
(c) Nitropropane
(d) Nitrobutanes
(e) Nitrohexanes
(f) Nitrooctanes
(g) Nitrooctadecanes
(h) Dinitroethane
(i) Dinitropropane
(j) Dinitrobutanes
(k) Dinitrohexanes
(l) Dinitrodecanes
(m) Phenyl nitromethanes
(n) Bromophenyl nitromethanes
(o) Nitrophenyl nitromethanes
(p) Methoxy phenyl nitromethanes
(q) Bis-(nitromethyl)cyclohexanes
(r) Bis-(nitromethyl)benzenes All of aforementioned compounds may be substituted with one or more additional substituents such as nitro, nitroalkyl, alkyl, alkenyl, alkoxy, aryloxy, halogen, alkylthio, arylthio, carboxyalkyl, cyano, isocyanato, and the like, and employed as reactants in the novel process of this invention. Specific examples of suitable substituted-organic nitro compounds which can be used are as follows:

(1) o-Nitrotoluene
(2) m-Nitrotoluene
(3) p-Nitrotoluene
(4) o-Nitro-p-xylene
(5) 2-methyl-1-nitronaphthalene
(6) m-Dinitrobenzene
(7) p-Dinitrobenzene
(8) 2,4-dinitrotoluene
(9) 2,6-dinitrotoluene
(10) Dinitromesitylene
(11) 4,4'-dinitrobiphenyl
(12) 2,4-dinitrobiphenyl
(13) 4,4'-dinitrodibenzyl
(14) Bis(p-nitrophenyl)methane
(15) Bis(2,4-dinitrophenyl)methane
(16) Bis(p-nitrophenyl)ether
(17) Bis(2,4-dinitrophenyl)ether
(18) Bis(p-nitrophenyl)thioether
(19) Bis(p-nitrophenyl)sulfone
(20) Bis(p-nitrophenoxy)ethane
(21) α,α'-Dinitro-p-xylene
(22) 2,4,6-trinitrotoluene
(23) 1,3,5-trinitrobenzene
(24) 1-chloro-2-nitrobenzene
(25) 1-chloro-4-nitrobenzene
(26) 1-chloro-3-nitrobenzene
(27) 2-chloro-6-nitrotoluene
(28) 4-chloro-3-nitrotoluene
(29) 1-chloro-2,4-dinitrobenzene
(30) 1,4-dichloro-2-nitrobenzene
(31) Alpha-chloro-p-nitrotoluene
(32) 1,3,5-trichloro-2-nitrobenzene
(33) 1,3,5-trichloro-2,4-dinitrobenzene
(34) 1,2-dichloro-4-nitrobenzene
(35) Alpha-chloro-m-nitrotoluene
(36) 1,2,4-trichloro-5-nitrobenzene
(37) 1-bromo-4-nitrobenzene
(38) 1-bromo-2-nitrobenzene
(39) 1-bromo-3-nitrobenzene
(40) 1-bromo-2,4-dinitrobenzene
(41) α,α-Dibromo-p-nitrotoluene
(42) α-Bromo-p-nitrotoluene
(43) 1-fluoro-4-nitrobenzene
(44) 1-fluoro-2,4-dinitrobenzene
(45) 1-fluoro-2-nitrobenzene
(46) o-Nitrophenyl isocyanate
(47) m-Nitrophenyl isocyanate
(48) p-Nitrophenyl isocyanate
(49) o-Nitroanisole
(50) p-Nitroanisole
(51) p-Nitrophenetole
(52) o-Nitrophenetole
(53) 2,4-dinitrophenetole
(54) 2,4-dinitroanisole
(55) 1-chloro-2,4-dimethoxy-5-nitrobenzene
(56) 1,4-dimethoxy-2-nitrobenzene
(57) m-Nitrobenzaldehyde
(58) p-Nitrobenzaldehyde
(59) p-Nitrobenzoylchloride
(60) m-Nitrobenzoylchloride
(61) 3,5-dinitrobenzoylchloride
(62) Ethyl-p-nitrobenzoate
(63) Methyl-o-nitrobenzoate
(64) m-Nitrobenzenesulfonylchloride
(65) p-Nitrobenzenesulfonylchloride
(66) o-Nitrobenzenesulfonylchloride
(67) 4-chloro-3-nitrobenzenesulfonylchloride
(68) 2,4-dinitrobenzenesulfonylchloride
(69) 3-nitrophthalic anhydride
(70) 1,4-dinitrocyclohexane
(71) Bis(p-nitrocyclohexyl)methane
(72) 1-nitro-n-hexane
(73) 2,2-dimethyl-1-nitrobutane
(74) 1,6-dinitro-n-hexane
(75) 1,4-bis(nitromethyl)cyclohexane
(76) 3,3'-dimethoxy-4,4'-dinitro-biphenyl
(77) 3,3'-dimethyl-4,4'-dinitro-biphenyl In addition, isomers and mixtures of the aforesaid organic nitro compounds and substiuted organic nitro compounds may also be employed, as well as homologues and other related compounds. Compounds which have both nitro and isocyanato substituents, such as 2-isocyanato-4-nitro toluene, may also be employed as a reactant.

The process of this invention is particularly effective in the conversion of aromatic nitro compounds to organic isocyanates. As used herein, the term "aromatic nitro compounds" represents those aromatic nitro compounds having at least one nitro group attached directly to an aromatic hydrocarbon nucleus, such as benzene, naphthalene, and the like, wherein the aromatic hydrocarbon nucleus may be substituted as illustrated above. Among the preferred organic nitro compounds which may be used in the practice of this invention are the nitrobenzenes, both mono- and polynitro, including isomeric mixtures thereof; the nitroalkylbenzenes, including the various nitrated toluenes and the nitrated xylenes; nitrated biphenyl and nitrated diphenylmethylene. Other preferred reactants include bis(nitrophenoxy)alkylenes and bis(nitrophenoxy)alkyl ethers. Generally, the organic nitro compounds and substituted organic nitro compounds contain between 1 and about 20 carbon atoms, and preferably between about 6 and about 14 carbon atoms.

The catalyst system of this invention includes at least one heteroaromatic nitrogen compound, at least one noble metal halide, either as separate constituents or as a complex, and at least one halide of a non-noble metal selected from the group consisting of iron and a metal of Groups IVa, Va, VIa, VIIa, IIb, IVb and Vb of the Periodic Table. The heteroaromatic nitrogen compound is one containing between five and six members in the ring, containing only nitrogen and carbon in the ring, containing no more than two nitrogen atoms in the ring, and containing at least two double bonds in the ring. Suitable compounds of this type disclosed in The Ring Index, by Patterson and Capell, Second Edition, American Chemical Society, 190, and Supplements I, II and III. Derivatives of the heteroaromatic nitrogen compounds may also be utilized. The term "derivatives" when used in conjunction with heteroaromatic compounds throughout the description and claims is intended to include additions to the parent heteroaromatic nitrogen-containing ring of the following type:

(I) Substituents on the ring
  (a) halides such as chlorine, bromine, iodine and fluorine
  (b) alkyl containing between 1 and 40 carbon atoms
  (c) aryl such as phenyl, cresyl and xylyl
  (d) olefinic such as allyl, vinyl
  (e) hydroxy
  (f) mercapto
  (g) amino
  (h) alkylamino
  (i) cyano
  (j) oxmino
  (k) aldehyde
  (l) ethers such as aryl, alkyl, and alkenyl ethers
  (m) thioethers such as aryl, alkyl, and alkenyl ethers
  (n) carboxy
  (o) carbalkoxy
  (p) carbamyl
  (q) carboaryloxy
  (r) thiocarbamyl (II) Polycyclic analogues
  (a) fused benzene
  (b) fused cycloaliphatic
  (c) fused nitrogen-containing heteroaromatic
(III) Simple salts
(IV) Quaternary salts
(V) Oxides
(VI) Complexes with inorganic substances other than noble metal halides
(VII) Mixtures of two or more additions of types I–VI.

Listed below are typical heteroaromatic nitrogen compounds and derivatives thereof which are suitable for use as components of the novel catalyst system of this invention.

(1) Five membered ring containing one nitrogen (a) 1-methyl pyrrole
(b) 1-phenyl pyrrole (2) Five membered ring containing two nitrogens (a) imidazole
(b) 1-methyl imidazole
(c) pyrazole (3) Fused benzene and fused nitrogen-containing heteroaromatic derivatives of five membered rings containing one nitrogen (a) indole
(b) indolenine (3-pseudoindole)
(c) 2-isobenzazole
(d) indolizine
(e) 4aH-carbazole
(f) carbazole (4) Six membered ring containing one nitrogen and derivatives thereof (a) pyridine
  ($a_1$) 2-methyl-5-ethylpyridine
(b) 2,6-dimethylpyridine
(c) 2,4,6-trimethylpyridine
(d) 4-phenylpyridine
(e) 2-vinylpyridine
(f) 2-styrylpyridine
(g) 2-bromopyridine
(h) 2-chloropyridine
(i) 3-chloropyridine
(j) 2,6-dichloropyridine
(k) 2-bromo-4-methylpyridine
(l) 2-fluoropyridine
(m) 2-allyloxypyridine
(n) 4-phenylthiopyridine
(o) 2-methoxpyridine
(p) picolinic acid
(q) nicotinic acid
(r) 2,6-dicyanopyridine
(s) pyridine-2-aldehyde (picolinaldehyde)
(t) 2-aminopyridine
(u) 4-dimethylaminopyridine
(v) diphenyl-4-pyridylmethane
(w) 4-hydroxypyridine
(x) 2-mercaptopyridine
(y) 2-oximinopyridine (picolinaldoxime)
(z) 4-tertiarybutylpyridine (5) Fused benzene and fused nitrogen-containing heteroaromatic derivatives of six membered ring containing one nitrogen (a) quinoline
(b) 2-chloroquinoline
(c) 8-hydroxyquinoline
(d) isoquinoline
(e) acridine
(f) phenanthridine
(g) 7,8-benzoquinoline
(h) 4H-quinolizine
(i) naphthyridine
(j) carboline
(k) phenanthroline
(l) Benzo [h] isoquinoline
(m) Benzo [g] quinoline
(n) Benzo [g] isoquinoline
(o) Benzo [h] quinoline
(p) Benzo [f] quinoline
(q) Benzo [f] isoquinoline
(r) 1H-benzo [de ] quinoline
(s) 4H-benzo [de] quinoline
(t) 4H-benzo [de] isoquinoline
(u) 1H-benzo [de] isoquinoline
(v) purine
(w) adenine
(x) pteridine
(y) 7H-pyrazino [2,3-c] carbazole
(z) Pyrazino [2,3-d] pyridazine
(aa) 4H-pyrido [2,3-d] carbazole
(bb) Pyrido [1',2':1,2] imidazo [4,5-b] quinoxaline
(cc) 6H-perimidine
(dd) perimidine (6) Six membered ring containing two nitrogens and derivatives thereof (a) pyrazine
(b) 4,6-dimethylpyrimidine
(c) 2,6-dimethylpyrazine
(d) pyridazine (7) Fused benzene and fused nitrogen-containing heteroaromatic derivatives of six membered rings containing two nitrogens (a) quinoxaline
(b) 2,3-dimethylquinoxaline
(c) phthalazine
(d) quinazoline
(e) phenazine
(f) cinnoline (8) Simple salts of heteroaromatic nitrogen compounds or derivatives thereof in Sections 1–7 above (a) Simple salts include nitrates, hydrohalides, sulfates and acetates of these compounds such as the following:
   (1) pyridine hydrochloride
   (2) 2-chloropyridine-1-oxide hydrochloride
   (3) 4-chloropyridine hydrochloride
   (4) 4,4′-bipyridyl dihydrochloride (9) Quaternary salts of heteroaromatic nitrogen compounds and derivatives thereof of Section 2 and 4–7 above (a) Alkyl halides, where alkyl contains 1–40 carbon atoms, acyl halides, and nitroaryl halides, such as:
   (1) 1-methylquinolinium chloride
   (2) laurylpyridinium chloride
   (3) 1-(4-pyridyl)pyridinum chloride hydrochloride

(10) Oxides of heteroaromatic bases and derivatives thereof of Sections 2 and 4–7 above (a) Oxides include oxides of quinoline, pyridine, isoquinoline, and imidazole, and are illustrated by the following oxides:
   (1) pyridine-1-oxide
   (2) 4-bromopyridine-1-oxide
   (3) 2-hydroxypyridine-1-oxide
   (4) picolinic acid-1-oxide
   (5) 4-methoxy pyridine-1-oxide
   (6) 2-bromo-6-methylpyridine-1-oxide
   (7) 2-picoline-1-oxide
   (8) 4-picoline-1-oxide

(11) Complexes of heteroaromatic nitrogen compounds with inorganic substances (other than noble metal halides) of Sections 2 and 4–7 above (a) Complexes include pyridine, quinoline and isoquinoline complexes illustrated by the following pyridine complexes:
   (1) (pyridine)$_3$·FeCl$_3$
   (2) pyridine·SO$_3$
   (3) pyridine·CrO$_3$
   (4) pyridine·VCl$_3$
   (5) pyridine·V$_2$O$_5$
   (6) pyridine·MoO$_3$ All of the foregoing heteroaromatic nitrogen compounds and derivatives thereof may be utilized as one component of the catalyst system along with the noble metal halide and the non-noble metal halide. The materials may be added separately to the reactor or as a mixture. In addition the foregoing heteroaromatic nitrogen compounds and derivatives thereof may be added as a complex with the noble metal halide. The complex is formed between the two components, as described more fully below. Typical complexes include the following:

(12) Complexes of a heteroaromatic nitrogen compound or derivatives thereof and a noble metal halide (a) Rh(pyridine)$_3$Cl$_3$
(b) Pd(pyridine)$_2$Cl$_2$
(c) Rh(isoquinoline)$_3$Cl$_3$
(d) Pd(isoquinoline)$_2$Cl$_2$
(e) Ir(pyridine)$_3$Cl$_3$
(f) Ir(isoquinoline)$_3$Cl$_3$
(g) Isoquinoliniumchloropalladite (isoquinoline)$_2$H$_2$PdCl$_4$
(h) Pd(isoquinoline)$_2$Cl$_4$
(i) Pd(pyridine)$_2$Cl$_4$
(j) Pd(pyridine)$_2$Br$_2$
(k) Pd(isoquinoline)$_2$Br$_2$
(l) Pd(pyridine)$_2$I$_2$
(m) Pd(isoquinoline)$_2$I$_2$ The second component of the catalyst system is at least one metal halide of a noble metal capable of forming a complex with the heteroaromatic nitrogen compound described above. Noble metals include ruthenium, rhodium, palladium, osmium, iridium, platinum, silver and gold. It is preferred that the metal be one of the platinum series, including a metal halide selected from the group consisting of halides of palladium, rhodium, platinum, iridium and mixtures thereof. Typical examples of suitable halides include palladous bromide, palladous chloride, palladous fluoride, palladous iodide, rhodium tribromide, rhodium trichloride, rhodium trifluoride, rhodium triiodide; platinic bromide, platinous bromide, platinic chloride, platinous chloride, platinic fluoride, platinous iodide, platinic iodide, rhenium trichloride, rhenium tetrachloride, rhenium tetrafluoride, rhenium hexafluoride, rhenium tribromide, iridium tribromide, iridium tetrabromide, iridium dichloride, iridium trichloride, iridium tetrachloride, iridium triiodide, iridium tetraiodide, and mixtures thereof. Oxides of the noble metals may also be employed and the term "halide of a noble metal" is used throughout the description and claims is intended to include metal halides set forth in this paragraph as well as the corresponding oxides, such as palladium oxide, rhodium oxide, platinum oxide, etc., and the like.

The heteroaromatic nitrogen compound and the noble metal halide as well as the non-noble metal halide of a metal selected from the group consisting of iron and a metal selected from Groups IVa, Va, VIa, VIIa, IIb, IVb, and Vb of the Periodic Table, as previously pointed out, may each be added separately to the organic nitro compound reactant or, if desired, may be premixed prior to adding to the organic nitro compound. When it is desired to utilize complexes of the heteroaromatic nitrogen compound and noble metal halide, the components may be first reacted in a suitable solvent such as monochlorobenzene, ethanol, or an excess of the heterocyclic nitrogen compound to form an organic metal halide complex, which is then isolated as a crystalline solid and added to the reaction mixture. For example, isoquinoline may be reacted with palladous dichloride in anhydrous organic media to form a cis complex of the structural formula:

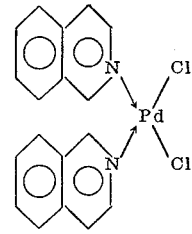

The corresponding trans complex may be prepared by reacting the heteroaromatic compound with an aqueous solution of a chloropalladite (formed by dissolving palladous chloride in an aqueous solution of an inorganic halide, such as sodium chloride or ammonium chloride). The trans complex has the following structural formula:

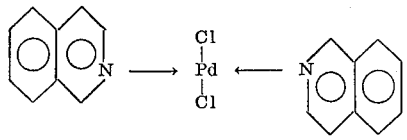

All other above specified heteroaromatic compounds may also be used to form corresponding organic metal halide complexes with the aforesaid metal halides for use in the catalyst system of this invention. Cis and trans forms are each effective as a catalyst system in the process of this novel invention. These heteroaromatic complexes may be prepared in accordance with the procedure described above for the isoquinoline-palladous chloride complex, including both the cis and trans forms. Other suitable complexes and other techniques for preparing the complexes of the heteroaromatic nitrogen compound and halides of a compound selected from the group consisting of palladium, rhodium, iridium and platinum are found in Advanced Inorganic Chemistry, by Cotton and Wilkinson, published by Interscience Publishers, 1962, as well as the following papers:

(1) "Inorganic Linkage Isomerism of the Thiocyanate Ion," by John L. Burmeister and Fred Basolo, Inorganic Chemistry, Vol. 3, No. 11, November 1964.

(2) "Synthesis and Infrared Study of Some Rhodium Coordination Compounds," by James P. Collman and Henry F. Holtzclaw, Jr., Journal of American Chemical Society, Vol. 80, May 5, 1958, pp. 2054–2056.

(3) "Catalytic Approaches to Complex Compounds of Rhodium (III)," by R. D. Gillard, J. A. Osborn, and G. Wilkinson, Journal Chemical Society, pp. 1951–1965, 1965.

(4) "The Action of Reducing Agents on Pyridine Complexes of Rhodium (III)," by B. N. Figgis, R. S. Nyholm, and G. Wilkinson, Journal Chemical Society, pp. 5189–5193, 1964.

Although all of the aforesaid catalyst systems have some effect on improving the yield of isocyanate, certain systems are significantly more effective than others. The following heteroaromatic compounds are included in these more effective systems:

(1) 7,8-benzoquinoline
(2) 4-phenylpyridine
(3) 4-picoline-1-oxide
(4) 3-picoline-1-oxide
(5) 8-hydroxyquinoline
(6) Pyridine
(7) Quinoline
(8) Isoquinoline
(9) 3-chloropyridine
(10) Picolinic acid
(11) Imidazole
(12) Lauryl pyridinium chloride
(13) 2-methyl-5-ethylpyridine Like the other components of the catalyst systems, the non-noble metal halide can be added separately to the reactor or it may be premixed with (a) the heteroaromatic nitrogen compound and the noble metal halide, (b) the complex formed with the heteroaromatic nitrogen compound and the noble metal halide, or (c) the non-noble metal halide may be converted to a complex by reaction with the noble metal halide and this complex may be employed as the catalyst in conjunction with an appropriate amount of heteroaromatic nitrogen compound. Finally, a ternary complex formed by reacting the complex prepared from the noble metal halide and the non-noble metal halide with the heteroaromatic nitrogen compound may be utilized as the catalyst system in the process of this invention.

Useful non-noble metal halides include, for example:

Titanium dichloride ($TiCl_2$)
Titanium trichloride ($TiCl_3$)
Titanium tetrachloride ($TiCl_4$)
Zirconium dichloride ($ZrCl_2$)
Zirconium trichloride ($ZrCl_3$)
Zirconium tetrachloride ($ZrCl_4$)
Vanadium dichloride ($VCl_2$)
Vanadium trichloride ($VCl_3$)
Vanadium tetrachloride ($VCl_4$)
Tantalum tetrachloride ($VCl_5$)
Chromous chloride ($CrCl_2$)
Chromic chloride ($CrCl_3$)
Manganous chloride ($MnCl_2$)
Manganic chloride ($MnCl_3$)
Ferrous chloride ($FeCl_2$)
Ferric chloride ($FeCl_3$)
Zinc chloride ($ZnCl_2$)
Mercurous chloride ($Hg_2Cl_2$)
Mercuric chloride ($HgCl_2$)
Germanous chloride ($GeCl_2$)
Germanic chloride ($GeCl_4$)
Stannous chloride ($SnCl_2$)
Stannic chloride ($SnCl_4$)
Plumbous chloride ($PbCl_2$)
Plumbic chloride ($PbCl_4$)
Arsenic trichloride ($AsCl_3$)
Arsenic pentachloride ($AsCl_5$)
Antimony trichloride ($SbCl_3$)
Antimony pentachloride ($SbCl_5$)
Bismuth trichloride ($BiCl_3$)
Bismuth pentachloride ($BiCl_5$)

The corresponding bromine and iodine compounds are also useful in the catalyst system of this invention.

Although all of the aforesaid catalyst systems have some effect on improving the yield of isocyanates, certain systems are significantly more effective than others. Included in these more effective systems are those which employ one or more of the following non-noble metal halides: germanic chloride, stannous chloride, stannic chloride, bismuth trichloride, plumbous chloride, chromic chloride and manganous chloride.

The catalyst system can be self-supported or deposited on a support or carrier for dispersing the catalyst system to increase its effective surface. Alumina, silica, carbon, barium sulfate, calcium carbonate, asbestos, bentonite, diatomaceous earth, fuller's earth, and analogous materials are useful as carriers for this purpose.

The reaction is carried out in the presence of a catalytic proportion of the catalyst system. The proportion of catalyst system is generally equivalent to between about 0.001 and about 500 percent, and preferably between about 1 and about 100 percent by weight of the organic nitro compound. However, greater or lesser proportions may be employed if desired.

The molar ratio of the heteroaromatic nitrogen compound to the anion of the noble metal halide is generally between about 0.01:1 and about 10:1, and preferably between about 0.5:1 and about 1.5:1, but greater or lesser ratios may be employed if desired. Likewise, the molar ratio of the heteroaromatic nitrogen compound to the anion of the non-noble metal halide will range from about 0.01:1 to about 10:1 and preferably between about 0.3:1 to about 2:1.

The process of this invention operates effectively in the absence of a solvent, but improved overall yields of the organic isocyanate can be obtained when a solvent which is chemically inert to the components of the reaction system is employed. Suitable solvents include aliphatic, cycloaliphatic and aromatic solvents such as n-heptane, cyclohexane, benzene, toluene, and xylene, and halogenated aliphatic and aromatic hydrocarbons such as dichloromethane, tetrachloroethane, trichlorotrifluoroethane, monochloronaphthalene, monochlorobenzene, dichlorobenzene, trichlorobenzene, and perchloroethylene, as well as sulfur dioxide, mixtures thereof and the like.

The proportion of solvent is not critical and any proportion may be employed which will not require excessively large equipment to contain. Generally the weight percent of organic nitro compound in the solvent is in the range between about 5.0 and about 75 percent, but greater or lesser proportions may be employed if desired.

The order of mixing the reactants is not critical and may be varied within the limitations of the equipment employed. In one embodiment, the organic nitro compound, catalyst system, and if desired, solvent, is charged to a suitable pressure vessel such as an autoclave which was previously purged with nitrogen, and which is preferably provided with agitation means such as a stirrer or an external rocking mechanism. At start-up, carbon monoxide is fed into the autoclave until a pressure is attained, at ambient temperature which is generally between about 30 and about 10,000 p.s.i.g. After the reaction proceeds and heat is applied, the pressure may increase to as high as 30,000 p.s.i.g. The preferred reaction pressure is between about 100 and about 20,000 p.s.i.g. However, greater or lesser pressures may be employed if desired.

Generally the quantity of carbon monoxide in the free space of the reactor is sufficient to maintain the desired pressure as well as provide reactant for the process, as the reaction progresses. If desired, additional carbon monoxide can be fed to the reactor either intermittently or continuously as the reaction progresses. The reaction is believed to progress in accordance with the following equation:

(I)    $R(NO_2)_n + 3nCO \rightarrow R(NCO)_n + 2nCO_2$ where R is the organic moiety of the organic nitro compound reactant of the type defined above, and $n$ is the number of nitro groups in the organic nitro compound. The total amount of carbon monoxide added during the reaction is generally between about 3 and about 50 and preferably between about 8 and about 15 moles of carbon monoxide per nitro group in the organic nitro compound. Greater or lesser amounts may be employed if desired. The highest carbon monoxide requirements are generally utilized in a process in which the carbon monoxide is added continuously, but suitable recycle of the carbon monoxide containing gas streams greatly reduces the overall consumption of carbon monoxide.

The reaction temperature is generally maintained above about 25° C. and preferably between about 100 and about 250° C. Interior and/or exterior heating and cooling means may be employed to maintain the temperature within the reactor within the desired range.

The reaction time is dependent upon the organic nitro compound being reacted, temperature, pressure, and on the amount of catalyst being charged, as well as the type of equipment being employed. Usually between one-half hour and 20 hours are required to obtain the desired degree of reaction, in a batch technique, but shorter or longer reaction times may be employed. In a continuous process, the reaction may be much lower, i.e., substantially instantaneous, and residence time may be substantially less than batch reaction time.

The reaction can be carried out batchwise, semi-continuously or continuously.

After the reaction is completed, the temperature of the crude reaction mixture may be dropped to ambient temperature, the pressure vessel is vented, and the reaction products are removed from the reaction vessel. Filtration or other suitable solid-liquid separation techniques may be employed to separate the catalyst from the reaction product, and fractional distillation is preferably employed to isolate the organic isocyanate from the reaction product. However, other suitable separation techniques such as extraction, sublimation, etc., may be employed to separate the organic isocyanate from the unreacted organic nitro compound and any by-products that may be formed.

Organic isocyanates produced in accordance with the technique of this invention are suitable for use in preparing polyurethane compositions such as foams, coatings, fibers, and the like by reacting the organic isocyanate with a suitable polyether polyol in the presence of a catalyst and, if desired, a foaming agent. In addition, the organic isocyanates may be used in the preparation of biologically active compounds.

As stated previously, certain of the aforesaid catalyst systems are more effective than others. Somewhat variable results are obtained in situations in which two pyridine or benzopyridine nuclei are joined together. Compounds of this type are unsatisfactory when used as a component of the catalyst system, if the configuration of the two nitrogens is such that after coordination with the noble metal halide, a five-member ring is formed. Compositions of this type which are unsatisfactory for use as a catalyst component include 2,2'-bipyridyl, 1,10-phenantholine, 2,2'-biquinoline or 2-pyridine-aldazine. However, in cases where a five-membered coordination complex ring cannot be formed with the noble metal halide, for example, compounds such as 2,2'-pyridyl and 4,4'-bipyridyl hydrochloride, these compounds function satisfactorily as a catalyst component for the conversion of nitro compounds to isocyanates.

Some improvement in the conversion and yield of organic isocyanates can be obtained by employing a catalyst system which not only contains the (1) aforesaid heteroaromatic nitrogen compound, (2) the noble metal halide, (3) the above-described non-noble metal halides, but also contains a fourth component comprised of certain metal oxides. Oxides suitable as a fourth component of the catalyst system include at least one oxide of an element selected from the group consisting of vanadium, molybdenum, tungsten, niobium, chromium, and tantalum, as described in co-pending application Ser. No. 619,158, filed Feb. 28, 1967, for Process, by Wilhelm J. Schnabel, Ehrenfried H. Kober and Theodore C. Kraus. These elements are found in Groups Va and VIa of the Periodic Table. Suitable oxides of this type include chromic oxide ($Cr_2O_3$), chromium dioxide ($CrO_2$), and chromous oxide (CrO); molybdenum sesquioxide ($Mo_2O_3$), molybdenum dioxide ($MoO_2$), and molybdenum trioxide ($MoO_3$); niobium monoxide (NbO), niobium oxide ($NbO_2$), and niobium pentoxide ($Nb_2O_5$); tantalum dioxide ($Ta_2O_2$), tantalum tetraoxide ($Ta_2O_4$), and tantalum pentoxide ($Ta_2O_5$); tungstic oxide ($WO_2$), and tungstic trioxide ($WO_3$); vanadium dioxide ($V_2O_2$), vanadium trioxide ($V_2O_3$), vanadium tetraoxide ($V_2O_4$) and vanadium pentoxide ($V_2O_5$). Mixtures of two or more of these oxides may be employed as one component of the catalyst mixture. The proportion of the fourth component of the catalyst system, when one is employed, is generally equivalent to a weight ratio of the noble metal halide compound to the metal oxide in the catalyst system generally in the range between about 0.0001:1 and about 25:1, and preferably in the range between about 0.005:1 and about 5:1.

The following examples are presented to describe the invention more fully without any intention of being limited thereby. All parts and percentages are by weight unless otherwise specified.

EXAMPLE I

In this example, 2,4-dinitrotoluene (5.0 grams), dichloro-bis(pyridine)palladium complex (0.75 g.) and germanic chloride (0.487 g.), were charged to a clean, 100 ml. stainless steel autoclave (316 grade) together with orthodichlorobenzene solvent (5 ml.).

The autoclave was sealed after being so charged, then pressured with nitrogen and tested for leaks. Nitrogen was released and the autoclave was pressured with carbon monoxide to about 2500 p.s.i.g. During the reaction the autoclave was rocked in a rocker (36 cycles per minute), and heated during one hour to 190° C., when the internal pressure rose to about 3750 p.s.i.g. This temperature was maintained for three hours, and then reduced to ambient temperature. After venting, the contents were discharged and weighed, and the autoclave was rinsed with two 5 ml. portions of orthodichlorobenzene. Insoluble matter present (unreacted catalyst or solids formed during the reaciton) was filtered from the reaction mixture and washed with dichlorobenzene, and then ether. The wash solutions were combined with the filtrate and the resulting solution was subjected to a determination of its infrared spectrum to test for the presence of isocyanates (which possess a characteristic infrared light absorption at about 4.5 microns). The filtrate was also subjected to analysis by vapor phase chromatography, to determine the weight percentage of 2,4-dinitrotoluene, 2,4-toluene diisocyanate, 2-isocyanato-4 - nitrotoluene and 4-isocyanato-2-nitrotoluene present. The conversion of 2,4-dinitrotoluene was calculated to be 94 percent. The yield of 2,4-toluene diisocyanate and the combined yield of mononitrotolyl isocyanates was calculated and then corrected for the amount of 2,4-dinitrotoluene which was recovered. The yield of toluene diisocyanate was 46 percent and the total yield of isocyanate products was 55 percent.

EXAMPLE II

The procedure of Example I was repeated except that the complex employed was dichloro bis(isoquinoline)palladium (0.75 g.) and the non-noble metal catalyst was stannic chloride (0.44 g.), the reaction temperature was 190° C., and the operating pressure 3800 p.s.i.g. The conversion was 93 percent, the yield of toluene diisocyanate was 18 percent and the yield of total isocyanate product was 47 percent.

EXAMPLE III

For purposes of comparison, the above procedure was repeated with exception that the catalyst system consisted solely of 0.75 g. of the complex dichloro bis(pyridine) palladium and no germanic chloride was employed. The conversion was 89 percent, the yield of toluene diisocyanate was 22 percent and the total isocyanate product was 43 percent. This comparison shows the improvement in conversion, yield of toluene diisocyanate and yield of total isocyanate product affected in the use of a non-noble metal halide, such as germanic chloride, in accordance with the technique of this invention.

EXAMPLES IV–XXXVIII

A number of additional examples were carried out in the same manner as in Examples I and II. In these examples the maximum pressure varied between 3600 and 4000 p.s.i.g. Pertinent data relating to these examples is shown in Table 1 which follows:

| Example | Catalyst system | |
|---|---|---|
| | Catalyst complex | Non-noble metal halide |
| XXXIX | Pd(pyridine)$_2$Cl$_4$ | Germanic chloride. |
| XL | Pd(isoquinoline)$_2$Cl$_4$ | Stannic chloride. |
| XLI | Rh(pyridine)$_3$Cl$_3$ | Stannous chloride. |
| XLII | Rh(isoquinoline)$_3$Cl$_3$ | Bismuth trichloride. |
| XLIII | do | Chromium trichloride. |

In each example, the yield of isocyanate was improved by the addition of the non-noble metal catalyst to the complex.

EXAMPLES XLIV–XLVI

The general procedure of Example I was repeated with the exception that the dichloro bis(isoquinoline) palladium complex and the germanic chloride were replaced with a catalyst system comprising a complex prepared from the noble metal halide and the non-noble metal halide together with a heteroaromatic compound. Details are present below.

| Example | Catalyst system | |
|---|---|---|
| | Catalyst complex | Heteroaromatic compound |
| XLIV | PdZnCl$_4$ | Isoquinoline. |
| XLV | PdSnCl$_4$ | 7,8-benzoquinoline. |
| XLVI | PdBiCl$_7$ | 4-phenylpyridine. |

In each example, the yield of isocyanate was improved over that obtained when a catalyst comprising only a complex of a noble metal halide and heteroaromatic compound was employed.

What is claimed is:

1. In the process for preparing an aromatic isocyanate by reacting an aromatic nitro compound containing up to about 20 carbon atoms with carbon monoxide at an elevated temperature and an elevated pressure in the presence of a catalyst, the improvement which comprises employing as said catalyst, a catalyst system selected from the group consisting of

TABLE 1

| | Catalyst | | | | | | |
|---|---|---|---|---|---|---|---|
| Example | Complex | Weight of complex (g.) | Non-noble metal halide | Moles non-noble metal halide/mole of complex | Temp. (° C.) | Conversion | TDI yield | Total corrected isocyanate yield |
| IV | iQ$_2$PdCl$_2$ | 0.75 | SnCl$_4$ | 1:1 | 190 | 96 | 30 | 67 |
| V | Same | 1.0 | GeCl$_4$ | 0.5:1 | 190 | 100 | 10 | 16 |
| VI | do | 1.0 | Same | 0.5:1 | 190 | 84 | 9 | 53 |
| VII | do | 0.75 | do | 1:1 | 190 | 97 | 27 | 60 |
| VIII | do | 0.75 | do | 1:1 | 190 | 100 | 56 | 79 |
| IX | do | 1.0 | do | 1.5:1 | 190 | 95 | 8 | 33 |
| X | do | 1.0 | do | 1.5:1 | 190 | 91 | 5 | 33 |
| XI | do | 0.75 | FeCl$_3$ | 1:1 | 190 | 100 | 17 | 22 |
| XII | do | 0.75 | Same | 1:1 | 190 | 96 | 26 | 48 |
| XIII | do | 0.75 | ZrCl$_4$ | 1:1 | 190 | 93 | 28 | 32 |
| XIV | do | 0.75 | Same | 1:1 | 190 | 100 | 4 | 9 |
| XV | do | 1.0 | SnCl$_2$ | 1.5:1 | 190 | 81 | 12 | 52 |
| XVI | do | 1.0 | do | 1.5:1 | 190 | 75 | 10 | 60 |
| XVII | do | 1.0 | do | 1:1 | 190 | 78 | 16 | 72 |
| XVIII | do | 1.0 | do | 1:1 | 190 | 68 | 13 | 76 |
| XIX | do | 1.0 | SbCl$_5$ | 1:1 | 190 | 94 | 2 | 15 |
| XX | do | 1.0 | do | 1:1 | 190 | 97 | 2 | 10 |
| XXI | do | 1.0 | BiCl$_3$ | 1:1 | 190 | 78 | 15 | 62 |
| XXII | do | 1.0 | do | 1:1 | 190 | 69 | 13 | 63 |
| XXIII | do | 1.0 | HgCl$_2$ | 0.5:1 | 190 | 90 | 12 | 36 |
| XXIV | do | 1.0 | do | 0.5:1 | 190 | 100 | 27 | 37 |
| XXV | do | 1.0 | ZnCl$_2$ | 0.5:1 | 190 | 68 | 10 | 49 |
| XXVI | do | 1.0 | do | 0.5:1 | 190 | 41 | 4 | 52 |
| XXVII | do | 1.0 | PbCl$_2$ | 0.5:1 | 190 | 80 | 11 | 70 |
| XXVIII | do | 1.0 | do | 0.5:1 | 190 | 79 | 10 | 71 |
| XXIX | do | 1.0 | VCl$_3$ | 0.5:1 | 190 | 100 | 23 | 23 |
| XXX | do | 1.0 | TaCl$_5$ | 0.5:1 | 190 | 100 | 25 | 37 |
| XXXI | do | 1.0 | do | 0.5:1 | 190 | 98 | 17 | 42 |
| XXXII | do | 1.0 | CrCl$_3$ | 0.5:1 | 190 | 63 | 18 | 82 |
| XXXIII | do | 1.0 | do | 0.5:1 | 190 | 88 | 19 | 73 |
| XXXIV | do | 1.0 | do | 0.5:1 | 190 | 89 | 19 | 75 |
| XXXV | do | 1.0 | MnCl$_2$ | 0.5:1 | 190 | 96 | 31 | 74 |
| XXXVI | do | 1.0 | do | 0.5:1 | 190 | 91 | 23 | 72 |
| XXXVII | do | 1.0 | MoCl$_4$ | 0.5:1 | 190 | 100 | 12 | 12 |
| XXXVIII | do | 1.0 | do | 0.5:1 | 190 | 100 | 10 | 10 |

NOTE.—iQ$_2$PdCl$_2$ represents Pd (isoquinoline)$_2$ Cl$_2$. TDI represents toluene diisocyanate.

EXAMPLES XXXIX–XLIII

The general procedure of Example I was repeated with the exception that the dichloro bis(isoquinoline)palladium complex and the germanic chloride were replaced with the following catalyst systems:

(I) a mixture of
  (A) a heteroaromatic nitrogen compound selected from the group consisting of
    (1) a heteroaromatic nitrogen compound having a ring containing
      (a) 5 or 6 members,
      (b) only nitrogen and carbon,
      (c) no more than two nitrogen atoms, and
      (d) at least two double bonds,
  (B) a noble metal compound selected from the group consisting of noble metal halides and noble metal oxides, and
  (C) a halide of a metal selected from the group consisting of titanium, zirconium, vanadium, tantalum, chromium, manganese, iron, zinc, mercury, germanium, tin, lead, arsenic, antimony, bismuth and mixtures thereof, or
(II) a mixture of a halide of IC and a complex of a compound of IA and a noble metal compound of IB, or
(III) a mixture of a compound of IA and a complex of a noble metal compound of IB and a halide of IC,
(IV) wherein the molar ratio of said heteroaromatic nitrogen compound to the anion of said noble metal compound in said catalyst system is in the range between about 0.01:1 and about 10:1,
(V) wherein the molar ratio of said heteroaromatic nitrogen compound to the anion of said halide of a metal is in the range between about 0.01:1 and about 10:1, and
(VI) wherein the noble metal of said noble metal compound is selected from the group consisting of palladium, rhodium, iridium, platinum, rhenium, ruthenium and mixtures thereof.

2. The process of claim 1 wherein the molar ratio of said heteroaromatic nitrogen compound to the anion of said noble metal compound is in the range between about 0.5:1 and about 1.5:1, and the molar ratio of said heteroaromatic nitrogen compound to the anion of said halide of a metal is between about 0.3:1 and about 2:1.

3. The process of claim 1 wherein the proportion of said catalyst system is between about 0.001 and about 500 weight percent of said aromatic nitro compound.

4. The process of claim 1 wherein the proportion of said catalyst system is between about 1 and about 100 weight percent of said aromatic nitro compound.

5. The process of claim 1 wherein said aromatic nitro compound is selected from the group consisting of nitrobenzene, dinitrotoluene and isocyanato-nitrotoluene.

6. The process of claim 5 wherein said catalyst system contains a fourth component comprised of an oxide of a metal selected from the group consisting of vanadium, molybdenum, tungsten, niobium, chromium and tantalum.

7. The process of claim 1 wherein the heteroaromatic nitrogen compound is selected from the group consisting of
  (a) 7,8-benzoquinoline
  (b) 4-phenylpyridine
  (c) 4-picoline-1-oxide
  (d) 3-picoline-1-oxide
  (e) 8-hydroxyquinoline
  (f) Pyridine
  (g) Quinoline
  (h) Isoquinoline
  (i) 3-chloropyridine
  (j) Picolinic acid
  (k) Imidazole
  (l) Lauryl pyridinium chloride
  (m) 2-methyl-5-ethylpyridine.

8. The process of claim 7 wherein said noble metal compound is selected from the group consisting of palladous chloride, rhodium trichloride, iridium trichloride, rhenium trichloride, platinic chloride and mixtures thereof.

9. The process of claim 8 wherein said halide of a metal is selected from the group consisting of germanic chloride, stannous chloride, stannic chloride, bismuth trichloride, plumbous chloride, chromic chloride, and manganous chloride.

10. The process of claim 9 wherein said catalyst system is a mixture of a halide of IC and a complex of a compound of IA and a noble metal compound of IB, said complex having a formula selected from the group consisting of
Pd(pyridine)$_2$Cl$_2$
Pd(pyridine)$_2$Cl$_4$
Pd(isoquinoline)$_2$Cl$_4$ and
Pd(isoquinoline)$_2$Cl$_2$.

11. The process of claim 10 wherein said aromatic nitro compound is selected from the group consisting of nitrobenzene, dinitrotoluene and isocyanato-nitrotolulene.

12. The process of claim 11 wherein said catalyst system is a mixture of germanic chloride and a complex of pyridine and palladous chloride having the formula Pd(pyridine)$_2$Cl$_2$.

13. The process of claim 11 wherein said catalyst system is a mixture of stannic chloride and a complex of isoquinoline and palladous chloride having the formula Pd(isoquinoline)$_2$Cl$_2$.

14. The process of claim 11 wherein said catalyst system is a mixture of stannous chloride and a complex of isoquinoline and palladous chloride having the formula Pd(isoquinoline)$_2$Cl$_2$.

15. The process of claim 11 wherein said catalyst system is a mixture of bismuth chloride and a complex of isoquinoline and palladous chloride having the formula Pd(isoquinoline)$_2$Cl$_2$.

16. The process of claim 11 wherein said catalyst system is a mixture of plumbous chloride and a complex of isoquinoline and palladous chloride having the formula Pd(isoquinoline)$_2$Cl$_2$.

17. The process of claim 11 wherein said catalyst system is a mixture of chromic chloride and a complex of isoquinoline and palladous chloride having the formula Pd(isoquinoline)$_2$Cl$_2$.

18. The process of claim 11 wherein said catalyst system is a mixture of manganous chloride and a complex of isoquinoline and palladous chloride having the formula Pd(isoquinoline)$_2$Cl$_2$.

19. The process of claim 11 wherein said catalyst system contains a fourth component comprised of an oxide of a metal selected from the group consisting of vanadium, molybdenum, tungsten, niobium, chromium and tantalum.

20. The process of claim 19 wherein said oxide of a metal is selected from the group consisting of chromic oxide ($Cr_2O_3$), chromium dioxide ($CrO_2$), and chromous oxide (CrO); molybdenum sesquioxide ($Mo_2O_3$), molybdenum dioxide ($MoO_2$), and molybdenum trioxide ($MnO_3$); niobium monoxide (NbO), niobium oxide ($NbO_2$), and niobium pentoxide ($Nb_2O_5$); tantalum dioxide ($Ta_2O_2$), tantalum tetraoxide ($Ta_2O_4$), and tantalum pentoxide ($Ta_2O_5$); tungstic oxide ($WO_2$), and tungstic trioxide ($WO_3$); vanadium dioxide ($V_2O_2$), vanadium trioxide $V_2O_3$), and vanadium tetraoxide( $V_2O_4$), vanadium pentoxide ($V_2O_5$), and mixtures thereof.

References Cited
UNITED STATES PATENTS 3,461,149  8/1969  Hardy et al. _____ 260—453
3,481,967  12/1969  Ottmann et al. _____ 260—453

CHARLES B. PARKER Primary Examiner

D. H. TORRENCE, Assistant Examiner

U.S. Cl. X.R.

252—429 C; 260—250 A; 250 R; 270 R, 299, 313.1, 315, 319.1, 326.1